(12) United States Patent
Chang

(10) Patent No.: US 6,972,285 B2
(45) Date of Patent: Dec. 6, 2005

(54) METHOD OF PREPARING A CONCENTRATED SOLUTION OF A POLYGLUCOSAMINE

(75) Inventor: Yan Chang, Ashland, MA (US)

(73) Assignee: Glycogenesys, Inc., Boston, MA (US)

( * ) Notice: Subject to any disclaimer, the term of this patent is extended or adjusted under 35 U.S.C. 154(b) by 636 days.

(21) Appl. No.: 10/134,783

(22) Filed: Apr. 29, 2002

(65) Prior Publication Data

US 2002/0183498 A1 Dec. 5, 2002

Related U.S. Application Data

(60) Provisional application No. 60/294,698, filed on May 31, 2001.

(51) Int. Cl.[7] .................................. C08B 37/08
(52) U.S. Cl. ......................... 514/55; 536/55.2
(58) Field of Search ............................. 514/55; 504/100, 504/101; 536/55.2

(56) References Cited

U.S. PATENT DOCUMENTS 5,268,174 A  12/1993 Sakuma et al. .......... 424/195.1
5,374,627 A  * 12/1994 Ito et al. ..................... 514/55
5,541,233 A  7/1996 Roenigk ...................... 521/54

FOREIGN PATENT DOCUMENTS

WO   WO 00/32041  *  6/2000  .............. C08J/9/16

OTHER PUBLICATIONS

Robyt, J. F. et al Oxidation of Primary Alcohol Groups of Naturally Occuring Polysaccharides With 2,2,6, 6–Tetramethyl–1–Piperidine oxoammonium ion:, J. Carbohydrate Chemistry, 1996, 15(7), 819–830.*

* cited by examiner

*Primary Examiner*—James O. Wilson
*Assistant Examiner*—Ganapathy Krishnan
(74) *Attorney, Agent, or Firm*—Gifford, Krass, Groh, Sprinkle, Anderson & Citkowski, P.C.

(57) ABSTRACT

A concentrated solution of a polyglucosamine such as chitin or chitosan is prepared by forming an aqueous slurry of said polyglucosamine with a peroxide, and adding copper ion to said slurry so as to solubulize said polyglucosamine.

20 Claims, No Drawings

METHOD OF PREPARING A CONCENTRATED SOLUTION OF A POLYGLUCOSAMINE

RELATION APPLICATION

This patent application claims priority of Provisional Patent Application Ser. No. 60/294,698 filed May 31, 2001 and entitled "Method of Preparing a Concentrated Solution of a Polyglucosamine".

FIELD OF THE INVENTION

This invention relates generally to polyglucosamines such as chitin and chitosan. Most specifically, the invention relates to methods for making highly concentrated solutions of chitin, chitosan and other such polyglucosamine materials.

BACKGROUND OF THE INVENTION

A number of polyglucosamines, particularly chitosan and chitin, are known to have utility as fungal control agents for plants and animals. As is known in the art, chitin is a biopolymer derived from a variety of sources including the exoskeletons of arthropods and the cell walls of fungi. Chitosan is a semi-synthetic derivative of chitin prepared by the partial deacetylation thereof. These materials typically have relatively high molecular weights, generally of 300 kd or more. However, in some instances, lower molecular weight fractions of these materials are prepared by various techniques, and all of such materials are included within the scope of this disclosure.

Heretofore, it has been very difficult to prepare solutions containing more than 2% by weight of chitin or chitosan, and this fact has limited the utility of these materials as fungal control agents. This limitation is particularly significant in agricultural applications where relatively large volumes of material are employed. On-site mixing of dry materials is generally difficult to carry out, so polyglucosamine fungicidal compositions are usually supplied as pre-mixed, aqueous stock solutions. The highly dilute nature of these solutions increases handling, shipping and storage costs. Clearly, it would be desirable to prepare more highly concentrated solutions of these materials, and these concentrates could be used either in a diluted or undiluted form as fungal control agents. Concentrated solutions of chitin, chitosan, and other polyglucosamines also have significant utility outside the field of agriculture. Such solutions have use as topical antifungals for medical and veterinary applications. Also, concentrated solutions can be used to prepare coatings and other articles of manufacture.

While in certain applications, organic solvents may be employed in the preparation of highly concentrated solutions of these materials, the use of organic solvents is precluded in most agricultural and medical applications. Therefore, there is a need for methods and techniques whereby concentrated, aqueous solutions of chitin, chitosan and other polyglucosamines may be prepared. As will be described herein below, the present invention allows for the manufacture of relatively concentrated, aqueous solutions of such materials. The compositions of the present invention are of low toxicity, and they exhibit a strong antifungal effect. Furthermore, the methods of the present invention are simple and economical to implement. These and other advantages of the invention will be apparent from the description and examples which follow.

BRIEF DESCRIPTION OF THE INVENTION

There is disclosed herein a method for preparing a concentrated solution of a polyglucosamine. The method includes the steps of forming a slurry of the polyglucosamine in water having an oxidizer dissolved therein. Copper ion is added to the slurry, and this combination of steps and materials produces a solution of the polyglucosamine. Peroxides are a preferred class of oxidizers, and hydrogen peroxide comprises one preferred peroxide material, and the copper is, in one preferred embodiment, in the form of copper gluconate. By the use of the present invention, solutions of relatively high molecular weight polyglucosamines having concentrations upward of 2% by weight can be prepared. In specific embodiments the present invention can be employed to prepare aqueous compositions comprised of 4–15% by weight of polyglucosamines.

In further embodiments of the present invention, the pH of the composition is adjusted to a range of 4–6. In another embodiment of the invention, zinc ion is added to the composition. In particular embodiments, the concentration of the copper ion in the resultant product is in the range of 0.1–5%, with one preferred range being 0.1–1%. In those instances where zinc ion is added, the zinc is also present in concentrations similar to that of the copper.

Also disclosed herein are compositions made by the methods of the present invention.

THE PRESENT INVENTION

In accord with the present invention, it has been found that concentrated aqueous solutions of chitosan, chitin and like polyglucosamine materials can be prepared by a procedure which comprises forming a slurry of the material with water and an oxidizer, and then adding copper ion to the solution. The combination of oxidizer and copper ion has been found to effectively solubilize polyglucosamine materials so that concentrated solutions thereof can be prepared. Peroxides comprise one preferred class of oxidizers, and in this disclosure the invention will be explained with reference to the use of peroxides. However, it is to be understood that other oxidizers such as hypochlorites and the like may be similarly employed. As noted above, it has heretofore been impossible to prepare aqueous chitosan solutions having a concentration of much more than 2%; however, through the use of the present invention, concentrations in the range of 4–15% can be reliably and repeatably prepared. Furthermore, it has been found that the presence of the copper ion in the solution further enhances the anti-fungal effect of the polyglucosamine material.

This invention will be described in detail with specific reference to the preparation of chitosan solutions, although it is to be understood that chitin solutions, or solutions of other polyglucosamine materials, can be similarly prepared.

In general, the order in which the peroxide, polyglucosamine and copper are added to the water may be varied. However, in particularly preferred embodiments, the polyglucosamine and peroxide are added to the water to form a slurry prior to the addition of the copper. In one particularly preferred embodiment, the peroxide, which is most preferably hydrogen peroxide, is first added to the water, with any optional surfactant and the like, and stirred to form a homogeneous solution. The polyglucosamine, which is preferably in the form of a powder, is added to the aqueous solution and stirred to form a smooth slurry. In one particularly preferred embodiment of the invention, the slurry is allowed to stand overnight prior to the addition of the copper. This "rest" period facilitates the ultimate dissolution of the polyglucosamine. It has been found that this "rest" period may be decreased as the concentration of peroxide is increased. Addition of the copper ion to the slurry results in the dissolution of the polyglucosamine. In a specifically preferred embodiment, the pH of the resultant solution is adjusted to a range of 4–6 by the use of an acid, with hydrochloric acid being one preferred acid; although, it is to be understood that other acids, including mineral acids and organic acids, may be employed for this purpose. In those instances where zinc or other metal ions are included in the composition, they are most preferably added following the addition of the copper, and generally after any pH adjustment is made. However, it has been found that zinc and/or other metals may be added concomitant with the copper addition.

In the practice of the present invention, it has generally been found that aqueous concentrations of peroxide in the range of 0.05–1.0% are preferred (all percentages given herein are on a weight basis). More specifically, concentrations in the range of 0.1–0.3% are preferred, and in one specific procedure, the peroxide concentration is 0.19%. In those instances where the peroxide is a high molecular weight material, higher percentages may be required. The copper ion is most preferably provided in the form of an organic compound, with copper gluconate being one particularly preferred form of copper ion. The concentration of copper (on a metal basis) is generally in the range of 0.1–5%, with a particularly preferred range being 0.1–1%. In a specifically preferred formulation, the copper concentration is 0.5%. In some instances, it is advantageous to acidify the water to a pH in the general range of 4–6. Also, surfactants, defoamers and the like may be added to the water prior to the addition of the chitosan to facilitate the formation of the slurry. One preferred surfactant comprises a nonionic alkylphenol ethoxylate, and a material of this type is sold by the Huntsman Chemical Company under the designation T-Det.

In some instances, other metal ions are advantageously added to the composition to further enhance the anti-fungal activity thereof. It has been found that the combination of zinc ion, copper ion and chitosan interact synergistically to produce a very effective, broad-spectrum fungicide. In those instances where other metal ions are added, this addition is typically made after the addition of the copper ion.

In one embodiment of the present invention, a 1,000 gallon batch of a chitosan-copper-zinc formulation was prepared as follows: 6,339 pounds (761 gallons) of deionized water was introduced into a glass lined mixing tank at ambient temperature (approximately 70° F.); 600 pounds (71 gallons) of a 3% solution of hydrogen peroxide was stirred into the water following which 9 pounds (1 gallon) of a commercial surfactant (T-Det 0-9 obtained from the Huntsman Chemical Company) and 9 pounds (1 gallon) of an antifoam agent (Dow Corning Antifoam A) were added. This mixture was stirred until uniform.

One thousand pounds (67 gallons dry volume) of chitosan was agitated and slowly sifted into the peroxide-surfactant-antifoam mixture. The chitosan comprised a relatively high molecular weight (over 300 kilodalton) commercial product obtained from crabs. It has been found that chitosan derived from crabs is particularly preferred for the practice of this invention, and chitosan derived from Alaskan deep sea crabs is most preferred. The chitosan was slowly sifted into the aqueous phase, and care was taken to assure that the added material wetted uniformly so as to avoid the formation of clumps. Mixing was carried on for at least 15 minutes following the last addition. This resulted in a smooth, easily mixable slurry. In some instances, it is advantageous to allow the slurry to stand overnight prior to the addition of further ingredients; however, this step is not absolutely essential, and may be eliminated or minimized, particularly if peroxide concentrations are on the high end of the preferred ranges.

Following the formation of the slurry, 360 pounds (16 gallons dry measure) of copper gluconate is added. Preferably, the copper gluconate is stirred in slowly, and mixing is continued for at least 4 hours following the last addition of copper. Care should be taken to avoid contact of the solution with metal stirrers or agitators for any extended period of time, since reaction may occur between the copper and any metal equipment. At this time, the mixture may be allowed to stand to complete the dissolution, and in this specific embodiment, the solution was allowed to stand overnight. Following the rest period, the mixture was gently stirred to dissipate any foam, and the pH was adjusted to approximately 4–6 by the addition of 600 pounds (65 gallons) of hydrochloric acid (20 degrees Celsius). Following pH adjustment, 400 pounds (18 gallons dry measure) of zinc gluconate was slowly sifted into the mixture with stirring. Following the last addition of the zinc gluconate, the mixture was stirred for 30 more minutes which produced a uniform, lump-free solution.

Following the final addition of zinc, the resultant mixture was filtered through a 20-mesh screen to remove any particulate contaminants. This produced a product comprising a dark green-colored liquid having a specific gravity at 20 degrees Celsius of approximately 1.104–1.128 and a corresponding weight per gallon in the range of 9.2–9.4 pounds. The viscosity of this mixture was approximately 600 cps (Brookfield, spindle no. 3, 30 rpm) an assay of the product showed that it contained 0.5% zinc, 0.5% copper and approximately 10.7% chitosan. This material was employed as a stock solution for the preparation of agricultural fungicides. In that regard, this stock solution was diluted at approximately 100:1 with water, and it was found to be effective against a wide variety of fungal infections in various food crops.

In a second embodiment of the present invention, a 1,000 gallon batch of an 8% chitosan formulation containing 0.4% each of copper and zinc was prepared as follows: 6,836 pounds (821 gallons) of deionized water was introduced into a glass lined mixing tank at ambient temperature (approximately 70° F.); 450 pounds (54 gallons) of a 3% solution of hydrogen peroxide was stirred into the water following which 9 pounds (1 gallon) of a commercial surfactant (T-Det 0-9 obtained from the Huntsman Chemical Company) and 9 pounds (1 gallon) of an antifoam agent (Dow Corning Antifoam A) were added. This mixture was stirred until uniform.

Seven hundred and thirty pounds (49 gallons dry volume) of the aforedescribed crab chitosan was agitated and slowly sifted into the peroxide-surfactant-antifoam mixture. The chitosan was slowly sifted into the aqueous phase, and care was taken to assure that the added material wetted uniformly so as to avoid the formation of clumps. Mixing was carried on for at least 15 minutes following the last addition. This resulted in a smooth, easily mixable slurry.

Following the formation of the slurry, 275 pounds (12 gallons dry measure) of copper gluconate (14% Cu) is added. Preferably, the copper gluconate is stirred in slowly, and care should be taken to avoid contact of the solution with metal stirrers or agitators for any extended period of time, since reaction may occur between the copper and any metal equipment. Once all of the copper has been added, the mixture is stirred until it is uniform, and 450 pounds (49 gallons) of the hydrochloric acid (20° Celsius) is added, after which the mixture is stirred for 4 hours, and then allowed to stand for 12 hours. Following the rest period, the mixture was gently stirred to dissipate any foam, and 450 pounds (49 gallons) of hydrochloric acid (20 degrees Celsius) was added. Following pH adjustment, 320 pounds (15 gallons) of zinc gluconate was slowly sifted into the mixture with stirring. Following the last addition of the zinc gluconate, the mixture was stirred for 30 more minutes which produced a uniform, lump-free solution.

Following the final addition of zinc, the resultant mixture was filtered through a 20-mesh screen to remove any particulate contaminants. This produced a product comprising a dark green-colored liquid having a specific gravity at 20 degrees Celsius of approximately 1.08–1.104 and a corresponding weight per gallon in the range of 9.0–9.2 pounds. The viscosity of this mixture was approximately 600 cps (Brookfield, spindle no. 3, 30 rpm) an assay of the product showed that it contained 0.4% zinc, 0.4% copper and approximately 8.0% chitosan. This material was employed as a stock solution for the preparation of agricultural fungicides. In that regard, this stock solution was diluted at approximately 80:1 with water, and it was found to be effective against a wide variety of fungal infections in various food crops.

While particular compositions and methods have been described herein, it is to be understood that yet other variations of the present invention may be implemented. There are a number of oxidizer compounds which may be employed in the practice of the present invention. Hydrogen peroxide is one particularly preferred material since it is low in cost, readily available and easy to employ. Another preferred oxidizer comprises urea peroxide ($CO(NH_2)_2 \cdot H_2O_2$). This compound is also known as percarbamide or carbamide peroxide. Urea peroxide is an easy-to-handle, powdered material and its utility is comparable to that of hydrogen peroxide in the present invention. Yet other oxidizers including hypochlorites and perchlorates as well as organic and inorganic peroxide materials may likewise be employed in the present invention. While the foregoing example employed both copper and zinc in the preparation of the formulation, it is to be understood that, depending upon the ultimate use of the composition, the zinc may be eliminated, or still other metal ions may be added. The compositions of the present invention may also include further ingredients such as coloring agents, rheology control agents, perfumes and the like. In some instances the materials of the present invention will form the base for cosmetics or other personal care items, and in that regard cleansing agents, emollients and the like may be incorporated into the compositions. Also, while the present disclosure is primarily directed to chitin and chitosan materials, it is to be understood that the principles of this invention may be employed to prepare relatively concentrated solutions of other polyglucosamine materials including natural, synthetic and semi-synthetic materials.

In view of the teaching presented herein, yet other modifications and variations of the present invention will be readily apparent to one of skill in the art. The foregoing discussion, description and examples are illustrative of specific embodiments of the invention, but are not meant to be limitations upon the practice thereof. It is the following claims, including all equivalents, which define the scope of the invention.

What is claimed is:

1. A method for preparing a solution of a polyglucosamine having a concentration which ranges from upward of 2% to 15% by weight, said method comprising the steps of:
   providing a volume of water;
   adding an oxidizer to said water;
   adding a polyglucosamine to said water, so as to form a slurry thereof; and
   adding copper ions to said slurry, whereby said method produces a solution of said polyglucosamine.

2. The method of claim 1, wherein said polyglucosamine is selected from the group consisting of chitin, chitosan, and combinations thereof.

3. The method of claim 1, wherein said polyglucosamine has a molecular weight of at least 300 kd.

4. The method of claim 1, wherein said polyglucosamine is chitosan.

5. The method of claim 1, wherein said oxidizer is hydrogen peroxide.

6. The method of claim 1, wherein said water is acidified to a pH in the range of 4–6.

7. The method of claim 1, wherein the step of adding an oxidizer comprises adding sufficient peroxide so as to produce a weight concentration of peroxide in the range of 0.05–1.0%.

8. The method of claim 7, wherein said concentration of peroxide is in the range of 0.1–0.3%.

9. The method of claim 7, wherein said peroxide concentration is 0.19%.

10. The method of claim 1, wherein the weight concentration of the polyglucosamine in said composition is in the range of 8–15%.

11. The method of claim 1, wherein the step of adding copper ion comprises adding sufficient copper ion so that the copper content by weight of said mixture is in the range of 0.1–5%.

12. The method of claim 11, wherein the concentration of copper is in the range of 0.1–1%.

13. The method of claim 11, wherein the concentration of copper is 0.4%.

14. The method of claim 1, wherein the step of adding copper ion comprises adding copper gluconate.

15. A concentrated solution of a polyglucosamine prepared according to the method of claim 1.

16. A method for preparing a fungicidal composition, said method comprising the steps of:
   providing a volume of water;
   adding a peroxide to said water so that the final concentration, by weight, of said peroxide in said composition will be in the range of 0.05–1.0%;
   adding a polyglucosamine to said water, so as to form a slurry thereof, said polyglucosamine being added in an amount sufficient to produce a weight concentration of said polyglucosamine in the final composition which is in the range of 8–15%;
   adding copper ion to said slurry, said copper ion being added in an amount sufficient so that the copper content, by weight, of said final composition is in the range of 0.1–5%;
   adjusting the pH of said composition so that it is in the range of 4–6; and
   adding zinc ion to said composition, said zinc ion being added in an amount sufficient so that the zinc content, by weight, of said composition is in the range of 0.1–5%.

17. A method for preparing a solution of a polyglucosamine having a concentration which ranges from upward of 2% to 15% by weight, said method comprising the steps of:
   providing a volume of water;
   adding an oxidizer to said water;
   adding a polyglucosamine to said water so as to form a slurry thereof;
   adding a copper ion to said slurry; and
   acidifying said slurry to a pH in the range of 2–4 after said copper ion is added, whereby said method produces a solution of said polyglucosamine.

18. A method for preparing a solution of a polyglucosamine having a concentration which ranges from upward of 2% to 15% by weight, said method comprising the steps of:
   providing a volume of water;
   adding an oxidizer to said water;
   adding a polyglucosamine to said water, so as to form a slurry thereof;
   adding copper ions to said slurry; and
   adding zinc ions, whereby said method produces a solution of said polyglucosamine.

19. The method of claim 18 wherein said zinc ions are added after said copper ions.

20. A method for preparing a solution of a polyglucosamine having a concentration which ranges from upward of 2% to 15% by weight, said method comprising the steps of:
   providing a volume of water including one or more of a surfactant and a defoamer;
   adding an oxidizer to said water;
   adding a polyglucosamine to said water, so as to form a slurry thereof; and
   adding copper ions to said slurry, whereby said method produces a solution of said polyglucosamine.

* * * * *